May 21, 1935.     J. R. WILLIAMS     2,002,425
VACUUM TUBE TESTER
Filed Aug. 4, 1933
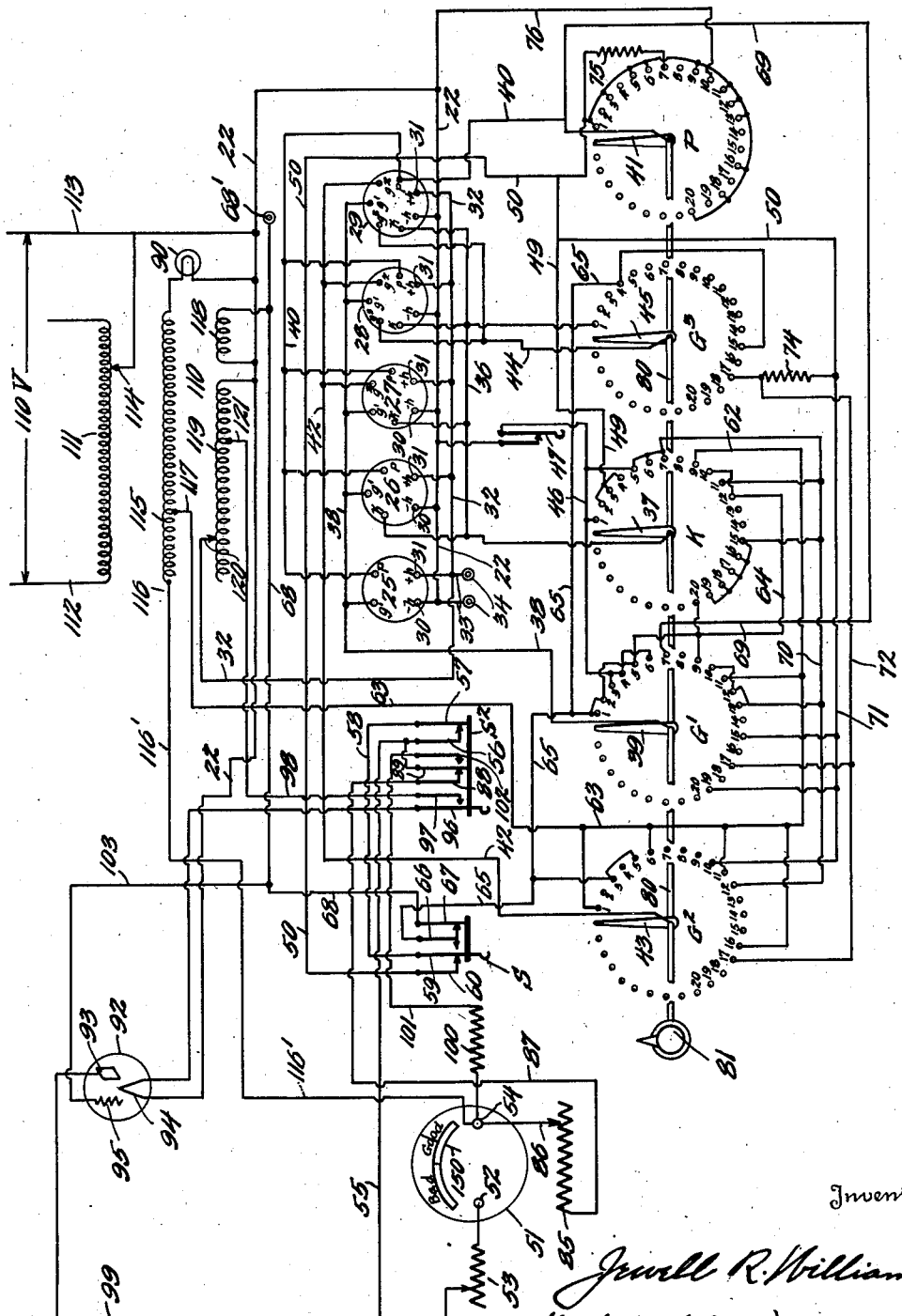
Inventor
Jewell R. Williams.
By Watson, Coit, Morse
& Grindle   Attorney Patented May 21, 1935

2,002,425

UNITED STATES PATENT OFFICE 2,002,425

VACUUM TUBE TESTER

Jewell R. Williams, Little Rock, Ark., assignor to Apparatus Design Company, Little Rock, Ark., a corporation of Arkansas Application August 4, 1933, Serial No. 683,688

14 Claims. (Cl. 250—27)

This invention relates to methods of and apparatus for testing vacuum tubes, particularly of the type used in radio receiving sets, in sound amplifying equipment, and in amateur transmitters.

It is a general object of the present invention to provide novel methods of and apparatus for testing vacuum tubes.

More particularly it is an object of the invention to provide simplified apparatus universally adapted for testing the various operating and fault characteristics of present and future types of radio tubes.

One of the important features of the invention resides in the provision of a tester of the type described universally adapted for testing all of the present types of vacuum tubes and equipped to test future types of tubes. This result is brought about by providing separate adjustments for the filament potential and shunt for the meter which is in the plate circuit of the tube being tested, as well as the provision of a multiple unit switch which applies to the various terminals of the testing sockets different testing voltages so as to permit tubes with varying arrangements of element to terminal connections to be tested with equal facility.

Another important feature of the invention resides in the provision of combined safety and short-circuit detecting means for limiting the current to that which will produce only about full scale reading of the meter to prevent injury to the meter in the event of short circuits within the elements of the tube.

A further important feature of the invention resides in the electrical characteristics of the plate testing secondary of the power transformer in order to improve the testing of all types of tubes, the transformer having a secondary so designed that the possible plate current delivery is limited by virtue of the regulation of the secondary which automatically limits both current and voltage and hence the load applied to the tube, thereby providing what may be termed a "plate current cut-off", in combination with a positive grid bias to serve the purpose of automatically bringing the plate current of the tube being tested on what is known as the straight part of the grid bias, plate current curve. This furnishes a large deviation on the meter from the predetermined indication when even slight changes from the required characteristics of the tube occur.

A further important feature of the invention resides in the use of a positive or in-phase grid biasing potential instead of the customary negative or opposite phase potential which has the effect of limiting the plate current and improving the testing characteristics.

Another important feature of the invention resides in the use of a controlled rectifier to permit a determination of the potential of the current source used for testing in order to allow of adjustment to insure the same testing potential being applied to the apparatus so that consistent results can be obtained. This rectifier tube is equipped with means for limiting the current flow therethrough in order that the same meter can be used for testing this potential as is used for indicating the worth of the tubes.

Other and further features and objects of the invention will be more apparent to those skilled in the art upon a consideration of the accompanying drawing and following specification, wherein is disclosed a single exemplary embodiment of the invention, with the understanding, however, that such changes and variations may be made therein as fall within the scope of the appended claims without departing from the spirit of the invention.

In said drawing:

The single figure is a diagrammatic and schematic showing of the circuits and parts of the apparatus, conventional symbols being used throughout.

In testing radio tubes for the purpose of sale or for determining the operating or fault characteristics of tubes which have been in use, it is highly desirable to provide apparatus not only of extreme simplicity but one which is adapted for universal testing of the characteristics of various types and styles of tubes. Such testers have heretofore been available but always subject to the serious disadvantage of rapid obsolescence. Recently there have appeared on the market in rapid succession large numbers of new types of tubes having various numbers of elements and having various element to pin terminal connections, so that in order to accommodate, for instance, a tube having five elements with one arrangement of connections to the pins required a different socket from a five-element tube having a different arrangement of elements to the pins. With the advent of six and seven-terminal sockets it can be seen that the number of necessary sockets to handle all of the complicated tubes, some of which involve three or more tubes in one, became very cumbersome and costly and required an experienced operator. In accordance with the present invention, it is proposed to provide only one socket of each type, i. e., each number of pin-receiving terminals. At the present time sockets having four, five, six, and seven terminals are common, but provision can be made for future sockets if desired. Each of these sockets will accommodate all of the tubes having its number of pin terminals, and switching means is provided so that the proper testing voltages can be applied to any element of the tube irrespective of the pin to which it may be connected. That makes the apparatus substantially universal and provides for future tubes since the new setting required for the purpose can be indicated on charts furnished from time to time to users of the devices.

The drawing is entirely schematic and it will be appreciated that the circuit arrangement can be incorporated in any suitable apparatus and container and that the various switches and adjustable contacts, push buttons, and the like can be embodied in such commercial forms as satisfy the desires of the manufacturer.

Referring now to the drawing, there is shown at 110 a transformer having primary winding 111, one end of which is directly connected to circuit wire 112 from a suitable source of alternating current, for instance, the conventional 110-volt house lighting circuit. The other wire 113 of this circuit is connected to the adjustable switch represented by slider 114 and taps on winding 111 to accommodate the tester to various applied voltages. By this means absolute fixed test voltages can be obtained irrespective of applied voltage.

The transformer has a high voltage secondary 115 to provide an optimum test voltage for application to the plates of all types of tubes. This winding is provided with maximum voltage tap 116 and lower voltage tap 117 for applying a somewhat lower fixed potential to screen grids and similar elements of certain tubes. A second secondary 118 is provided, the purpose of which is to produce a potential to be applied to control grids or other grid elements of tubes being tested and which also has an optimum potential suitable for the testing of all tubes using the optimum plate voltage. This winding applies a potential to the control grids that is in phase with the plate potential and thus gives the equivalent of a positive grid bias to hold the normal plate current of the tube being tested on the straight part of the grid bias plate current curve.

A third secondary 119 is applied to the transformer and includes a plurality of taps adapted to be engaged by slider 120 to provide suitable filament or heater voltage for each of the types of tubes for which the apparatus is equipped for testing. A fixed tap 121 is also provided for a purpose to be later described.

A common or ground conductor 22 connects together power wire 113, slider 114, one end of winding 115 through a resistance to be later described, one end of winding 118, and one end of winding 119 so that these parts all have a common potential.

The drawing shows five sockets 25, 26, 27, 28, and 29 having, respectively, from four to seven terminals each for receiving tubes having a corresponding number of base pins. Two seven-terminal sockets are shown to accommodate the two sizes of tube bases, but a composite socket could as well be used just as a combination four, five and six-terminal and a five, six and seven-terminal socket could be used to replace all of the individual sockets at the discretion of the manufacturer. The corresponding bottom terminals on each of the sockets are numbered 30 and 31. All of the terminals 30 are connected by short conductors to common conductor 22, and all of the terminals 31 are connected by short conductors to wire 32 which is connected to switch 120 on the filament or heater secondary, so that by a setting of this switch in accordance with designations which may be provided for the purpose the proper voltage for the tube about to be tested can be applied simultaneously to all sockets. On socket 25 a pair of flexible conductors 33 are provided with clips 34 to apply filament voltage to certain types of tubes having external caps for the purpose.

The heater or filament elements are the only ones which are consistently connected to the same positioned pins on the tube bases to be received in correspondingly positioned terminals in the socket, so in order to be able to apply the proper voltages for testing to the other elements of the tubes, it is necessary that provision be made for applying these various test voltages more or less universally and interchangeably to each of the socket terminals, and for this purpose each terminal of the socket having the largest number of terminals is provided with a selector switch enabling it to be connected to any of the appropriate testing voltages provided by the transformer by a proper setting of the switch. Each of the other sockets has its corresponding terminals connected to the same switches.

For purposes of designation only, the most common positioning of the terminals in each socket has been indicated thereon by the following letters:

$h+$, $h-$ indicates the heater or filament terminals.

$g'$ indicates the control grid terminal
$p$ indicates the plate terminal
$k$ indicates the cathode terminal
$g^2$ indicates the screen grid terminal
$g^3$ indicates the suppressor grid terminal For some types of tubes these parts have the element to pin connection indicated in the drawing. The seven-terminal socket has all of the terminals above listed, whereas the six-terminal socket omits the suppressor grid, the five-terminal socket omits the suppressor and the screen grids, and the four-terminal socket omits the suppressor grid, the screen grid, and the cathode. Further to complicate matters, some sockets have a top cap usually connected with the control grid so that there may be as many as eight terminals to a tube. In order to provide a connection for such top caps, a flexible lead from the control grid bias conductor 68 is provided with a clip 68'.

The selector switches, for convenience, are lettered in order from left to right, $G^2$, $G'$, K, $G^3$ and P and correspond to the same lettering on the socket terminals. The movable arm of each switch is connected to all of the socket terminals of the same designation. Tracing these circuits it will be seen that all $k$ terminals are connected to conductor 36 which leads to movable arm 37 of the K switch. All $g'$ terminals are connected to conductor 38 which leads to arm 39 of the G' switch. All $p$ terminals are connected to conductor 40 which leads to arm 41 of the P switch. All $g^2$ terminals are connected to wire 42 which leads to arm 43 of $G^2$ switch, while all $g^3$ terminals are connected to wire 44 leading to arm 45 of $G^3$ switch.

Each switch arm being connected to one or more of the nominally designated socket terminals enables these terminals to be connected to any source of testing voltage or to any other terminal which may be connected to one of the contacts of that switch.

Considering first the cathode or K switch in which the contacts are marked 1, 2, 3 etc. in succession starting at the right of the illustrated position of the switch arm 37. Thus it will be seen that contact 1 is connected to wire 46, which leads through normally closed switch 47 to common wire 22 so that when lever 37 is on contact 1, the cathode of any tube in the sockets will be connected to the common conductor and thus to one side of the heater. Contacts 2, 3 and 4 of the K switch are connected by wire 49 to wire 50 which is supplied with plate testing voltage from the secondary 115 as follows: From 115 through wire 116' to terminal 54 of meter 51 to terminal 52, resistance 53, wire 55, switch spring 56, switch spring 57, wire 58, switch spring 59, switch spring 60, to wire 50, thus enabling the nominal cathode terminals of the sockets to be supplied with plate testing voltage through the meter 51. The next three contacts as well as contacts 11 and 15 to 19, inclusive, are connected the same as contact 1. Contact 9 is connected by wire 62 to wire 63 and tap 117 on the high voltage winding 115 of the transformer which provides screen grid voltage. Contacts 10, 12 and 20 are connected together by wire 64 and to contacts 1, 2, 5 and 9 of G' switch, and thence by wire 65 to switch spring 66, switch spring 67, wire 68, to the secondary 118 which provides grid bias voltage. The remaining contacts of K switch are blank but are available for future tubes with probable new arrangements of element terminals.

Tracing the contacts of G' switch, it is found that Nos. 1, 2, 5, and 9 are connected to wire 65 which has just been described as leading to the secondary 118 providing grid bias voltage. Contacts 3, 4 and 6 are connected to wire 46 which has previously been described as connected back to common wire 22. Contact 7 is connected by wire 69 to wire 40 which is connected to the contact arm 41 of the P switch, thus enabling the g' terminals to be connected to the p terminals. Contacts 10, 12 and 13 are connected to wire 70 which is connected to contact 12 of switch G², to a number of contacts of switch K and through them to wire 46 leading back to common wire 22. Contact 11 is connected to wire 62 and wire 63 back to the screen grid tap on the high voltage winding 115. Contacts 15 and 19 are connected to wire 71 which leads to wire 50 which, as previously described, provides plate testing voltage. Contact 17 is connected to wire 72 which leads to contact 17 on switch G² and contact 17 on switch G³. Between wire 72 and wire 50 is a resistance 74, the purpose of which is to reduce the normal plate testing potential by the voltage drop through this resistance for the purpose of testing diode plates, which plates do not normally in the operation of the tube have a fixed potential applied, but for the purposes of test must have. The remainder of the contacts on switch G' are blanks.

Contacts 1, 3, 5, 6, 9, 11, 12, 13, 16, 18, and 20 of the P switch are connected directly to the wire 50 which provides plate testing voltage as previously described. Contact 7 is connected to wire 50 and plate testing voltage through the resistor 75, the purpose of which is the same as the resistor 74 to provide a reduced diode plate testing voltage. Contact 10 of the P switch is connected by wire 76 to common wire 22 while the remaining contacts of this switch are blanks.

In switch G² contacts 1, 6, 11 and 16 are connected to wire 63 which leads to the screen grid tap on the high voltage transformer winding. Contacts 3 and 5 are connected to wire 65 which leads through the wire 68 to the grid bias secondary 118. Contact 10 is connected to wire 71 which leads to wire 50 with plate testing potential. Contact 12 is connected to wire 70 which in turn is connected to contacts on various of the other switches and finally to wire 46 and to common conductor 22. Contact 17 is connected to wire 72 which through resistance 74 and wire 50 provides a diode plate testing potential. The remaining contacts on switch G² are blanks.

Switch G³ has its contact 1 connected to wire 36 which connects together all of the cathodes of the various sockets and leads to switch arm 37 of K switch, thus enabling G³ to be connected to the cathodes if desired. Contacts 4 and 15 are connected to a branch of wire 65 which, as previously described, leads to the grid bias secondary and contact 17 is connected through the diode plate resistor 74 to the plate testing potential lead 50. The remaining contacts on G³ are blanks.

The peculiar disposition of the wires to the various switch contacts, including the spacing of certain of them by blanks, is to permit simultaneous setting of all of the switches each with its arm on the correspondingly numbered contact, by means of the insulated rod 80 having knob 81 for simultaneously operating all of these switches. It will be understood that the knob is provided with a pointer which plays over a dial numbered in accordance with the contact numbers on the various switches. These numbers correspond to numbers on a chart which includes in one column a list of all of the available tubes by type numbers and in the next column the setting for the switch knob 81 to make proper connections for testing each tube. A third column shows the setting for the switch 120 for providing the proper filament or heater voltage. A single setting of the switch 81 equips the tester for testing a tube in accordance with designations on the chart and provides the proper potential for its various elements irrespective of their connection to the base pins. Where a tube contains several sets of elements as, for instance, a duo-diode-pentode, several settings of the knob 81 may be necessary for individually testing the sets of elements that correspond to complete tubes in themselves.

The testing operation is effected by applying to each of the elements of the tube under test its proper optimum testing voltage and including, in series in the plate testing circuit, the meter 51 which is preferably a milliammeter having a one mil full scale range. It is desired that this meter always have its needle indicate at the same position on the dial for tubes of the same worth irrespective of variations in their plate current. For this purpose an adjustable shunt 85 is provided for the meter, the switch arm 86 being movable over a series of switch points or the like to adjust the shunt to a value indicated on the chart previously described for the tube being tested, so that if the tube is functioning properly, the meter will indicate, for instance, in that section of the dial scale marked "Good", whereas if it is not in proper working order, the section on the scale marked "Bad" will be indicated. Other designations intermediate in character may be placed on the dial if desired. Shunt 85 has its switch arm 86 directly connected to the terminal 54 of the meter, but the other terminal of the shunt is connected by wire 87 to switch spring 88 normally engaging switch spring 89 which leads to wire 55 and resistor 53 to the terminal 52 of the meter. This resistor 53 is indicated as being adjustable but that is only to adapt the device for preliminary calibration at the factory so that it will be in scale with the setting of the adjustable resistor 85, and thus meters with manufacturing variations can be properly adapted to the testing equipment without changing the equipment.

The meter 51 being in the plate circuit is adapted for testing the current flow to any element of the tube which may by virtue of the setting of the multiple switches be connected to the plate testing voltages.

The equipment has provisions for other tests than operating characteristics. For instance it may be desirable to test for a short-circuit between the cathode and the heater of the tube. Under some settings of the switches the cathode is connected to the heater circuit in order to have a return to the common wire 22 for the space current. If now this connection be opened by pressing the switch spring 47, then the cathode may be considered as floating or disconnected and the meter needle should drop back to zero since there is no return to the common wire for the space current, but in the event that it does not do so when this switch 47 is pressed to disconnect the cathode, then this is a sure indication of a short circuit between the cathode and the heater in the tube, indicating that the tube is not satisfactory for those uses which require separate connections for the cathode and heater.

A small electric lamp 90 is connected between the low voltage end of the plate potential winding 115 and the common conductor 22 and serves several purposes. In the event of a short-circuit between certain tube elements, for instance, the plate and filament, a sufficient current flows, since there is no appreciable resistance in the tube then, to light this lamp and to indicate to the operator that there is a short-circuit in the tube. The lamp will also light in the event of certain other short-circuits, as will be obvious.

The second function of this lamp is to protect the meter. It will be appreciated that if the meter is shunted, say for 20 mils plate current, to read at about three-quarters scale for good tubes, then current appreciably greater than 20 mils would move the meter beyond the full scale deflection and probably destroy it, but with this lamp in circuit any tendency for the current in the plate secondary to rise unduly is counteracted by a rapid increase in the resistance of the filament of this lamp. The filament is of the tungsten type and has a positive temperature co-efficient. The resistance of the filament increases about ten times from cold to hot. To enable the filament to produce the automatic protection for the meter, the secondary 115 is wound to a certain maximum current capacity which cannot be exceeded even on short-circuit so that there are nicely balanced the maximum plate secondary current, the hot and cold resistances of the lamp, and any value of shunt which might be selected during tube testing, so that in no case can more than full scale deflection of the meter take place irrespective of the condition of the tube being tested.

The protective short-circuit indicating lamp just described is assisted in its function by virtue of the peculiar regulation characteristics of the plate potential secondary of the transformer. This secondary has what may be termed extremely "poor regulation"; that is, with increased load there is a decided drop in voltage. This results from a very fine winding on the secondary which limits the current which can be taken therefrom. Several important results are achieved by this type of winding. First, the total current necessary to be handled by the meter and its shunt is kept small and within a narrow range and, second, by combination with the in-phase grid bias it is possible to maintain the plate current of the tube being tested within the straight portion of the grid bias, plate current curve with the following results: First, a smaller meter and shunt are possible and, second, greater changes in amplitude of the meter and needle swing result from smaller tube characteristic changes than otherwise, for instance, very slight changes in plate current resulting from faulty filament emission, increased plate impedance, misplacement of elements and the like. Of course, the useful limits of needle swing either above or below normal are predetermined on the meter scale by giving appropriate values to the meter shunts, as selected by the selector switch, so that tubes with either high or low normal plate current indicate alike as far as the meter position is concerned.

With the positive or in-phase grid bias, any variation of space charge effect is greatly enhanced and is more readily indicated on the meter so that actually the combination of in-phase grid bias and poor regulation of the transformer permits indications of faults in tubes which cannot be recognized by the normal type of tester using a plate voltage secondary with almost unlimited current capacity and opposite phase grid bias.

In testing full wave rectifiers which have a filament and two plates, the test of one plate which is connected to the normal $p$ terminal in the four-terminal socket is made in the conventional manner since the current from this plate flows through the meter in the normal manner. The switches are set so that G' is on some terminal connected to the grid bias secondary, but this has no effect as the meter is not in circuit with the second plate to which some small space current flows by virtue of this bias. This setting is convenient because there are a number of other tubes requiring the same switch setting, and it thus materially simplifies the apparatus as well as the subsequent test of the second plate. In order to test this second plate which is connected to the normal $g'$ terminal of socket 25, switch S must be pressed to change it from the position indicated to one where spring 59 engages contact 66 and spring 67 is disengaged therefrom. At the same time spring 59 is disengaged from spring 60. This produces the following result: It transfers the plate current which originally could be traced from the secondary tap 116 through wire 116' to the meter, from the meter through wire 55 to switch spring 56, switch spring 57, wire 58, switch spring 59, switch spring 60, wire 50 to contacts 1, 3, 5, 6, 9, 11, 12, 13, 16, 19 and 20 of P switch, through switch arm 41 set on one of them, wire 40 to the $p$ terminals of the sockets, thus testing the first plate of the rectifier. On pushing switch S, plate voltage which has already flowed through the meter is transferred by spring 59 to spring 66 and flows through wire 65 to contacts 1, 2, 5 and 9 on G' switch, thence through plate 39 set on one of them and wire 38 to g' terminals on the sockets, thus permitting the second plate to be tested. At the same time the circuit between 59 and 60 is opened, disconnecting the other plate from the circuit. It should be noted that what actually happens is that changing of switch S transfers terminals 1, 2, 5 and 9 of switch G' from their normal grid bias potential to a plate potential.

The circuit described for testing the first plate of a rectifier is substantially duplicated as far as the plate circuit is concerned for any tube being tested, the switch P being given an appropriate setting to obtain for all the other switches their necessary settings so that, for instance, for a normal three-element tube the g' terminals are provided by means of their switch with the grid bias voltage. For a four-element tube, in addition to these voltages, a suitable voltage is applied to the screen grid terminals through the $G^2$ switch, which also has a proper setting. It will be clear then that any type of tube can be tested if it is known where to set the various switches, and for this purpose their initial connections are so made that on turning the knob 81 appropriate potentials can be applied to all of the elements of any type tube needing them for the test. The blanks on some of the switches are obviously for the purpose of omitting potential from those elements not requiring it during the test in question and/or for future tubes.

The accurate testing of tubes to determine their worth implies a definite testing voltage for each energized terminal as well as for the filament or heater. The ratios of these various voltages are readily fixed by the turns ratios of the various windings on the transformer, but a change in the potential applied to the primary winding of the transformer would upset these values, and since commercial circuits vary from 105 to probably 125 volts in different localities and sometimes from time to time in the same circuit, it is advisable to be able to measure the applied voltage and make compensation for it. This is done indirectly by measuring the voltage of one of the secondaries and adjusting the tap switch 114 on the primary to compensate for the difference in the applied voltage. Meters are costly and it is simpler to use the single meter, for the sake of economy of materials, size, and weight, so provision is made for using the meter 51 for testing the applied voltage, making use of the transformer and a rectifier so that the meter, which is of the direct current type, functions properly. It must be remembered that in its normal operation the meter is functioning with a rectified alternating current, for the very operation of the tube being tested implies rectification.

When the meter is to be used for testing the applied voltage, a separate rectifier must be provided which forms a part of the testing apparatus. This rectifier is designated by the reference character 92 and is of the three-element tube type including plate 93, filament 94 and grid 95. The filament has one terminal connected to the common wire 22 and the other to the spring 96 on the switch $S^2$. In the position shown, the switch is arranged for normal tube testing, but when testing for the applied voltage it is pressed to move the movable springs to the right so that in describing the operation of the rectifier tube it will be assumed that the switch is pressed. The spring 96 connects to spring 97, wire 98, to fixed voltage tap 121 on the filament secondary. Plate 93 of the rectifier tube is connected by wire 99 to the terminal 52 of the meter, the other terminal of the meter being connected by wire 116' to the high voltage secondary, thus forming a series circuit for the rectifier current through the meter. It will be remembered that the meter is normally shunted by the adjustable shunt 85, but this shunt is connected to the meter through wire 87 and switch springs 88 and 89, which latter are now separated, disconnecting the shunt 85.

In order to adapt the meter to indicate properly when determining applied voltage, it is applied with a supplemental shunt 100 for that purpose which is directly connected to the terminal 54. From its other end a wire 101 leads to switch spring 102 which is now connected to spring 89 which by way of wire 55 is connected to terminal 52 of the meter, thus putting the new shunt in place of the adjustable shunt and fitting the meter for testing voltage.

The meter, it will be remembered, is an ammeter, and instead of equipping it with a high resistance as a multiplier it is equipped with a shunt, so what it really reads is the plate current of the rectifier tube. This plate current, however, will vary in accordance with the applied voltage, and since the meter is a very sensitive one it will record accurately in terms of voltage, but some means must be provided for limiting the current flow. For this purpose the grid 95 of the rectifier tube is connected by the wire 103 to the wire 68 and by that to the grid bias winding, thus providing an in-phase grid bias for better control of the current flow through the rectifier tube.

The last set of switch springs 56, 57 in the switch $S^2$ opens the main plate voltage testing circuit during the applied voltage test, leaving the meter free to read the applied voltage. With the described arrangement of the switch $S^2$ it is possible to check the applied voltage at any time even during a tube test, for the switch completely separates the two functions of the meter. An appropriate marking 150 can be placed on the meter dial to aid in adjusting the switch 114 to obtain the proper testing voltages.

The use of a positive or in-phase bias on the grid of the rectifier tube results in improvements similar to those described in connection with the use of this type of grid bias in the tubes being tested, for it increases the range of the meter needle swing for minor deviations in applied line voltage. If a negative grid bias were to be used, a higher induced plate voltage due to an increased line voltage would produce a higher negative bias which of its own accord would hold the swing meter to narrow limits, making it difficult to adjust for changes in line voltage. With the manual adjustment required, the in-phase bias makes matters much simpler, particularly in the hands of unskilled operators.

In the claims, for convenience, the words "filament" and "heater" have been used interchangeably and either is intended to imply both where necessary.

Having thus described the invention, what is claimed as new and desired to be secured by Letters Patent is:—

1. In a device for testing radio tubes, in combination, a plurality of sockets, each having a different number of terminals, means connecting together the common terminals of the sockets, means to supply an adjustable voltage to the filament terminals of all sockets, a network adapted to supply simultaneously a plurality of testing voltages, a meter in circuit with one of said voltages, a selector switch for each type terminal except filament, and circuits whereby each selector may connect an associated terminal to any one of said voltages.

2. In a device for testing radio tubes, in combination, a plurality of sockets, each having a different number of terminals, means connecting together the common terminals of the sockets, means to supply an adjustable voltage to the filament terminals of all sockets, a network adapted to supply simultaneously a plurality of testing voltages, a meter in circuit with one of said voltages, a selector switch for each type terminal except filament, circuits whereby each selector may connect an associated terminal to any one of said voltages, and circuits whereby different type terminals may be connected together by their selectors.

3. In a device for testing radio tubes, in combination, a plurality of sockets, each having a different number of terminals, means connecting together the common terminals of the sockets, means to supply an adjustable voltage to the filament terminals of all sockets, a network adapted to supply simultaneously a plurality of testing voltages, a meter in circuit with one of said voltages, a selector switch for each type terminal except filament, circuits whereby each selector may connect an associated terminal to any one of said voltages, and circuits whereby different type terminals may be connected together by their selectors, each selector having positions in which its type terminal is completely disconnected from all circuits.

4. In a device for testing radio tubes, in combination, a plurality of sockets, each having a different number of terminals, means connecting together the common terminals of the sockets, means to supply an adjustable voltage to the filament terminals of all sockets, a network adapted to supply simultaneously a plurality of testing voltages, a meter in circuit with one of said voltages, a selector switch for each type terminal except filament, circuits whereby each selector may connect an associated terminal to any one of said voltages, and means to actuate all of said selectors conjointly, the circuits of said selectors being so arranged that all required test conditions can be imposed on each socket whereby there is a selector actuator position to test any type tube irrespective of the order in which the elements may be connected to the pins associated with the socket terminals.

5. In a device for testing radio tubes, in combination, a source of current, a network for producing simultaneously therefrom a plurality of testing voltages including a plate potential, said network also producing a heater voltage, a meter in the plate potential circuit and responsive to current flow therein, sockets for receiving tubes of various numbers of base pins and each having terminals connected to the heater voltage source, means to adjust the heater voltage to that required by the tube under test, those of the remaining terminals of the sockets which correspond being connected together, a selector switch for each type of terminal and having an arm connected thereto, stationary contacts for each arm so connected into said network that any terminal except heater may be connected to any testing voltage or to other terminals or completely disconnected, an adjustable shunt for said meter, and a chart designating settings for heater voltage adjuster, shunt adjuster, and selector switches for testing any type tube, said meter shunts being so selected as to always give the same scale deflection on the meter for tubes of the same worth irrespective of type.

6. In a device for testing radio tubes, in combination, a group of sockets, each having filament terminals and terminals for various other tube elements, means to supply the requisite voltage to all the filament terminals, a selector switch arm for and connected to each other element-type terminal, contacts for each switch arm supplied with each kind of test potential required by the type tube element possible to connect to its socket terminal, and a meter in circuit with one of said potentials to indicate the condition of the tube being tested.

7. In a device for testing radio tubes, in combination, a socket, a transformer having windings adapted to supply filament current to a tube in said socket and a definite fixed plate potential to said tube for testing the worth of the same, a milliammeter adapted to be included in the plate circuit, a shunt for said meter to adapt it to read "on scale" for various types of tubes, means to permit measuring the potential applied to the primary of said transformer comprising a rectifier, an additional shunt for the meter, and a switch and circuits to interchange shunts, remove the meter from the tube testing circuit, and place it in series with the plate potential and rectifier.

8. In a device for testing radio tubes, in combination, a socket, a transformer having windings adapted to supply filament current to a tube in said socket and a definite fixed plate potential to said tube for testing the worth of the same, a milliammeter adapted to be included in the plate circuit, a shunt for said meter to adapt it to read "on scale" for varous types of tubes, means to permit measuring the potential applied to the primary of said transformer comprising a rectifier, an additional shunt for the meter, a switch and circuits to interchange shunts, remove the meter from the tube testing circuit, and place it in series with the plate potential and rectifier, and means to control the rectifier to regulate the current flow so that it is not always in definite ratio to potential applied to the rectifier.

9. In a device for testing radio tubes, in combination, a transformer having a winding to supply a definite plate potential to a tube for testing its worth, a milliammeter adapted to be included in the plate circuit, an adjustable shunt for said meter to cause it to read "on scale" for various types of tubes, a circuit for adapting said meter to indicate the value of the testing plate potential including a fixed shunt, a three-element tube having filament and plate to rectify the potential and apply it in series to the meter, means to interchange said shunts, and means to place an in-phase bias on the third element of the rectifier tube to regulate the current flow to the meter.

10. In a tester for radio tubes, in combination, a socket, means to apply heater current to appropriate terminals thereof, a source of fixed potential plate current, a meter connected to be influenced by said plate current, and means to apply a lesser potential to a diode plate of the tube under test comprising a resistor between said source and the diode plate terminal of the socket having such resistance that the diode plate current flowing therethrough will provide the required voltage drop.

11. In a testing device for radio tubes, in combination, a socket to receive tubes to be tested, a transformer having windings connectible to the socket to provide filament, plate, and grid excitation, the plate potential winding having regulation sufficiently poor to limit plate current to a position on the plate current-grid voltage curve which is straight, and a meter in the plate circuit.

12. In a testing device for radio tubes, in combination, a socket to receive tubes to be tested, a transformer having windings connectible to the socket to provide filament, plate, and grid excitation, the plate and grid secondary windings providing the socket with in-phase potentials, a meter in the plate circuit, and a shunt for the meter adjustable to cause it to read the same for all types of tubes of the same worth, the in-phase potentials causing greater variations of the meter position for deviations from said worth than with opposite phase grid and plate excitation.

13. In a testing device for radio tubes, in combination, a socket to receive tubes to be tested, a transformer having windings connectible to the socket to provide filament, plate, and grid excitation, the plate potential winding having very poor regulation and low current capacity, a meter in the plate circuit and the grid winding producing a potential in phase with the plate winding potential to hold the plate current at a critical value susceptible to major variations of meter indication with minor changes in tube characteristics.

14. In a device for testing radio tubes including a milliammeter and a transformer adapted to supply a voltage in fixed ratio to its exciting voltage, in combination, means to test the said exciting voltage including a three-element thermionic tube having filament and plate so connected to said transformer as to rectify the supplied voltage, means to connect the said meter in the plate circuit of said tube and means to place a bias on the third element of the tube in phase with the rectified voltage whereby the meter may be calibrated to indicate the voltage of the supply circuit.

JEWELL R. WILLIAMS.